United States Patent
Ono et al.

(10) Patent No.: US 6,378,982 B2
(45) Date of Patent: *Apr. 30, 2002

(54) PRINTING APPARATUS AND A PRINTING METHOD

(75) Inventors: Mitsuhiro Ono; Daigoro Kanematsu; Hidehiko Kanda, all of Kawasaki; Yoshinori Nakajima, Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/189,722

(22) Filed: Nov. 12, 1998

(30) Foreign Application Priority Data

Nov. 14, 1997 (JP) ............................................. 9-314057
Nov. 9, 1998 (JP) ............................................. 9-318085

(51) Int. Cl.⁷ ............................ B41J 2/145; B41J 2/15; B41J 29/38
(52) U.S. Cl. ................................ 347/41; 347/9; 347/12
(58) Field of Search ............................... 347/43, 40, 41, 347/9, 12, 16; 358/1.8

(56) References Cited

U.S. PATENT DOCUMENTS

| 4,963,882 | A | * | 10/1990 | Hickman | 347/43 |
| 4,967,203 | A | | 10/1990 | Doan et al. | 347/43 |
| 5,661,508 | A | * | 8/1997 | Sugimoto et al. | 347/9 |
| 5,818,474 | A | | 10/1998 | Takahashi et al. | 347/15 |
| 5,852,454 | A | | 12/1998 | Kanematsu et al. | 347/40 |
| 5,889,537 | A | * | 3/1999 | Shimada | 347/41 |
| 6,010,205 | A | * | 1/2000 | Billet | 347/40 |
| 6,067,405 | A | * | 5/2000 | Serra | 347/40 |
| 6,283,572 | B1 | * | 9/2001 | Kumar et al. | 347/19 |

FOREIGN PATENT DOCUMENTS

| JP | 60214671 | 10/1985 |
| JP | 62076869 | 4/1987 |

* cited by examiner

Primary Examiner—Thinh Nguyen
(74) Attorney, Agent, or Firm—Fitzpatrick, Cella, Harper & Scinto

(57) ABSTRACT

In a multipass printing using a print head which has a plurality of staggered columns of print elements, one and the same print line is formed by using nozzles (k1-129, k2-1) of different nozzle columns (k1, k2) to disperse the directivity of landing deviations of dots in the same print line.

24 Claims, 19 Drawing Sheets

| 1 | 2 | 1 | 2 | 1 | 2 | 1 |
|---|---|---|---|---|---|---|
| 2 | 1 | 2 | 1 | 2 | 1 | 2 |
| 1 | 2 | 1 | 2 | 1 | 2 | 1 |
| 2 | 1 | 2 | 1 | 2 | 1 | 2 |
| 1 | 2 | 1 | 2 | 1 | 2 | 1 |
| 2 | 1 | 2 | 1 | 2 | 1 | 2 |

*FIG.1*

|   |   |   |   |   |   |   |   |
|---|---|---|---|---|---|---|---|
| 1 | 2 | 3 | 4 | 1 | 2 | 3 | 4 |
| 4 | 1 | 2 | 3 | 4 | 1 | 2 | 3 |
| 3 | 4 | 1 | 2 | 3 | 4 | 1 | 2 |
| 2 | 3 | 4 | 1 | 2 | 3 | 4 | 1 |
| 1 | 2 | 3 | 4 | 1 | 2 | 3 | 4 |
| 4 | 1 | 2 | 3 | 4 | 1 | 2 | 3 |

*FIG.11*

| MODE | NUMBERS OF PRINTING PATHS | NUMBERS OF NOZZLES IN USE | FEED LENGTH |
|---|---|---|---|
| A | 2 | 242 | 121 |
| B | 4 | 244 | 61 |
| C | 6 | 240 | 39.5/40.5 |
| D | 6 | 246 | 41 |
| E | 8 | 240 | 29.5/30.5 |
| F | 8 | 240 | 31 |
| G | 12 | 120 | 9.5/10.5 |
| H | 12 | 240 | 19.5/20.5 |

FIG.18

PRINTING APPARATUS AND A PRINTING METHOD

This application is based on Patent Application Nos. 314,057/1997 filed on Nov. 14, 1997 in Japan and 318,085/1998 filed on Nov. 9, 1998 in Japan, the content of which is incorporated hereinto by reference.

BACKGROUND OF THE INVENTION

1. Field of the Invention

The present invention relates to a printing apparatus and a printing method that are applicable to any apparatuses for printing recording mediums, such as paper, cloth, nonwoven fabric and OHP, and more specifically to a printing apparatus and a printing method which are most suitable for an ink-jet printing apparatus installed in a variety of office equipment and mass-produced apparatuses such as printers, copying machines and facsimiles.

2. Description of the Prior Art

An ink-jet printing apparatus for printing recording mediums such as paper, cloth, plastic sheets and OHP sheets has been commercialized as an output means of information processing systems, for example as a printer for copying machines, facsimiles, electronic typewriters, word processors and workstations, or as a handy or portable printer used on personal computers, host computers, optical disk drives and video tape recorders.

The ink-jet printing apparatus in the above case has a structure corresponding to part of this type of equipment, or incorporated into their unique functions. Generally, the ink-jet printing apparatus comprises a carriage mounted with a recording means (print head) and an ink tank; a feeding means to feed print paper; and a control means to control the recording means and the feeding means. The print head ejects an ink from a plurality of nozzles and is serially scanned in a direction (hereinafter referred to as a main scan direction) perpendicular to the print paper feeding direction (a sub-scan direction) and at the same time the print paper is intermittently advanced by a distance equal to a recording width during non-printing periods. This method delivers ink onto the print medium according to a print signal to perform printing and has found a wide range of applications as a low-noise recording system with a small running cost.

Because the print head has many ink ejecting nozzles arranged in line in the sub-scan direction, scanning the print head over the print paper results in the paper being printed in a width corresponding to the number of nozzles, thus assuring high-speed printing.

In recent years, a device has been in use that includes a plurality of print heads for three to four colors to form full-color images. This device can mount four print heads and four ink tanks corresponding to three primary colors—yellow (Y), magenta (M) and cyan (C)—and black (B).

A recent trend of the ink-jet printer is for reducing the size of ink droplets to enhance the printed image quality to cope with high-speed printing and photograph printing. The reduced size of ink droplets requires enhanced landing precision. It is, however, unavoidable that the actual landing points of the ink droplets are deviated from ideal landing positions.

To deal with this problem, Japanese Patent Laid-Open Nos. 214,670/1985 and 214,671/1985, and U.S. Pat. Nos. 4,963,882 and 4,967,203 offer a multipass recording method. In this recording method, the image data is divided into predetermined arrays for first and second scans so that the first-scan array and the second-scan array complement each other. Generally, the divided arrays of the pixels are like a hound's-tooth check pattern in the vertical and lateral directions as shown in FIG. 1 and the material to be printed is fed intermittently when the printing is not performed. FIG. 1 represents pixels in the form of squares in a grid and the numbers indicate in which scan the ink will be ejected onto the corresponding pixels. With the multipass recording, because one line is formed of ink droplets ejected from different nozzles, variations that depend on the nozzles can be reduced.

There is also a printing apparatus which has a plurality of columns of ink ejecting nozzles to improve the printing resolution for higher image quality. In this case, the deviations between the ink droplet actual landing positions and the ideal landing positions differ from one nozzle column to another. In other words, the same nozzle column will produce the similar landing deviations. The inventor of this invention has found that if only the nozzles of the same nozzle column are used in each scan line to form an image, an unevenness of an image by the nozzle is reduced, but an unevenness of the image by the nozzle column is not reduced at all, and this results in large unevenness of an image during the quantization process, causing significant image quality degradation in some cases.

This is explained by taking an example shown in FIGS. 2 through 5. FIG. 2 shows a print head having columns of nozzles n1, n2, the nozzle column n1 ranging from nozzle n1-1 to nozzle n1-256 and the nozzle column n2 from nozzle n2-1 to nozzle n2-256. Let us consider a case where the nozzles n1-1 to n1-256 of the nozzle column n1 have ink landing points that tend to deviate to the right from ideal landing points and the nozzles n2-1 to n2-256 of the nozzle column n2 have ink landing points that tend to deviate to the left from ideal landing points. It is assumed that a print pattern as shown in FIG. 3 is printed by a 1-raster-2-pass multipass printing. With the division method used by this multipass printing, ink dots are thinned out to form a hound's-tooth check pattern described above. FIG. 3 represents pixels in the form of squares in a grid and dots in the form of circles. When there are no deviations between the actual landing points and the ideal landing points, the image produced will have a uniform dot distribution as shown in FIG. 3. In the case under consideration, however, the image obtained will be as shown in FIG. 4. This is because the landing positions of odd-numbered lines of dots produced by the nozzle column n1 are deviated to the right on the sheet of the figure and because the landing positions of even-numbered lines of dots produced by the nozzle column n2 are deviated to the left. The directions of deviations of the landing points are shown in FIG. 5, from which it is seen that the deviation direction changes for each line.

Hence, when the multipass recording is performed by the print head which has a plurality of staggered columns of print elements, an actual printed image looks to have a slantwise texture, different from the one that is originally intended to be represented.

SUMMARY OF THE INVENTION

An object of this invention is to provide a printing apparatus and a printing method, which can form an image strictly according to what is intended to be represented by the image data even when a multipass printing is performed by a print head which has a plurality of staggered columns of print elements.

The present invention provides a printing apparatus using a print head. The printing apparatus may comprise a main scan means to move the print head relative to a recording medium in a main scan direction; a sub-scan means to move the recording medium relative to the print head in a sub-scan direction different from the main scan direction; and a control means to main-scan the print head a plurality of times over one and the same print line on the recording medium with at least one sub-scan operation interposed between the main scan operations to print the line, the print head having a plurality of staggered columns of print elements; wherein the control means uses the print elements of different columns to complete the printing of the same print line.

According to the invention, the print elements may be print elements for an ink-jet printing system.

According to the invention, odd-numbered columns of the print elements and even-numbered columns of the print elements may be staggered with respect to each other.

According to the invention, the control means may scan the print head two times over the same print line by interposing between the main scan operations the sub-scan operation which advances the recording medium by a distance equal to one-half the length of the print element columns plus or minus one-half the print element interval.

According to the invention, the control means may scan the print head two times over the same print line by interposing between the main scan operations the sub-scan operations which advances the recording medium by a distance equal to one fourth the length of the print element columns plus or minus one-half the print element interval.

According to the invention, the odd-numbered columns and the even-numbered columns of the print elements each may use an odd number of print elements for printing, and the control means may scan the print head two times over the same print line by interposing between the main scan operations the sub-scan operation which advances the recording medium by a distance equal to one-half the length of the print element columns.

According to the invention, the odd-numbered columns and the even-numbered columns of the print elements each may comprise four times an arbitrary odd number of print elements, and the control means may scan the print head four times over the same print line by interposing between the main scan operations the sub-scan operation which advances the recording medium by a distance equal to one fourth the length of the print element columns.

According to the invention, the odd-numbered columns and the even-numbered columns of the print elements each may comprise n times an arbitrary odd number of print elements, and the control means may scan the print head n times over the same print line by interposing between the main scan operations the sub-scan operation which advances the recording medium by a distance equal to one n-th the length of the print element columns where n is an arbitrary natural number other than 1.

According to the invention, the printing apparatus may be capable of color printing and have a plurality of columns of print elements for each print color.

According to the invention, the printing method using a print head to perform printing may comprise the steps of: moving the print head relative to a recording medium in a main scan direction; moving the recording medium relative to the print head in a sub-scan direction different from the main scan direction; and controlling to main-scan the print head a plurality of times over one and the same print line on the recording medium with at least one sub-scan operation interposed between the main scan operations to print the line, the print head having a plurality of staggered columns of print elements; wherein the print elements of different columns are used to complete the printing of the same print line.

According to the invention, the print elements may be print elements for an ink-jet printing apparatus.

According to the invention, odd-numbered columns of the print elements and even-numbered columns of the print elements may be staggered with respect to each other.

According to the invention, the control step may scan the print head two times over the same print line by interposing between the main scan operations the sub-scan operation which advances the recording medium by a distance equal to one-half the length of the print element columns plus or minus one-half the print element interval.

According to the invention, the control steps may scan the print head two times over the same print line by interposing between the main scan operations the sub-scan operations which advances the recording medium by a distance equal to one fourth the length of the print element columns plus or minus one-half the print element interval.

According to the invention, the odd-numbered columns and the even-numbered columns of the print elements may each use an odd number of print elements for printing, and the control step may scan the print head two times over the same print line by interposing between the main scan operations the sub-scan operation which advances the recording medium by a distance equal to one-half the length of the print element columns.

According to the invention, the odd-numbered columns and the even-numbered columns of the print elements may each comprise four times an arbitrary odd number of print elements, and the control step may scan the print head four times over the same print line by interposing between the main scan operations the sub-scan operation which advances the recording medium by a distance equal to one fourth the length of the print element columns.

According to the invention, the odd-numbered columns and the even-numbered columns of the print elements may each comprise n times an arbitrary odd number of print elements, and the control means may scan the print head n times over the same print line by interposing between the main scan operations the sub-scan operation which advances the recording medium by a distance equal to one n-th the length of the print element columns where n is an arbitrary natural number other than 1. This invention may be capable of color printing and have a plurality of columns of print elements for each print color.

According to the invention, because the printed dots representing one and the same line are formed by ink droplets ejected from the nozzles of different nozzle columns, the degree to which the dot landing deviations have a directivity in the line can be alleviated. As a result, when an image is formed by using nozzle columns whose ink droplet landing positions will deviate, it is possible to prevent unintended textures from appearing in the printed image.

The above and other objects, effects, features and advantages of the present invention will become more apparent from the following description of embodiments thereof taken in conjunction with the accompanying drawings.

BRIEF DESCRIPTION OF THE DRAWINGS

FIG. 1 is a schematic diagram showing the print positions allocated in a hound's-tooth check pattern;

FIG. 11 is a schematic diagram showing the print position allocation (selection) block of a second embodiment of this invention;

FIG. 18 is a table of print modes in a fourth embodiment of this invention; and

DETAILED DESCRIPTION OF PREFERRED EMBODIMENTS

Now, embodiments of the present invention will be described in detail by referring to the accompanying drawings.

(Embodiment 1)

Figure 6:
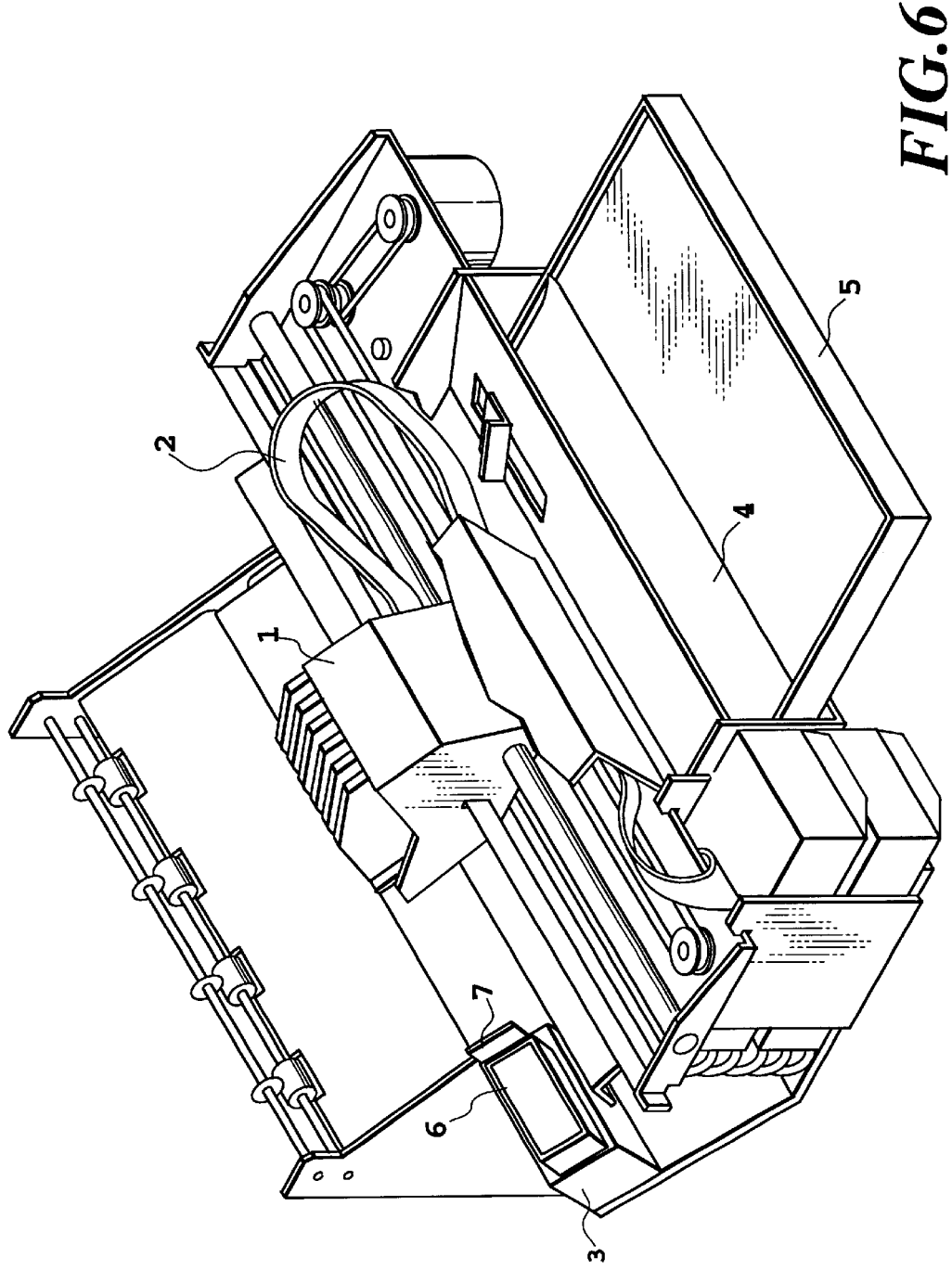
FIG. 6 is a schematic view showing an outline construction of the ink-jet printer as one embodiment of this invention.
Figure 7:
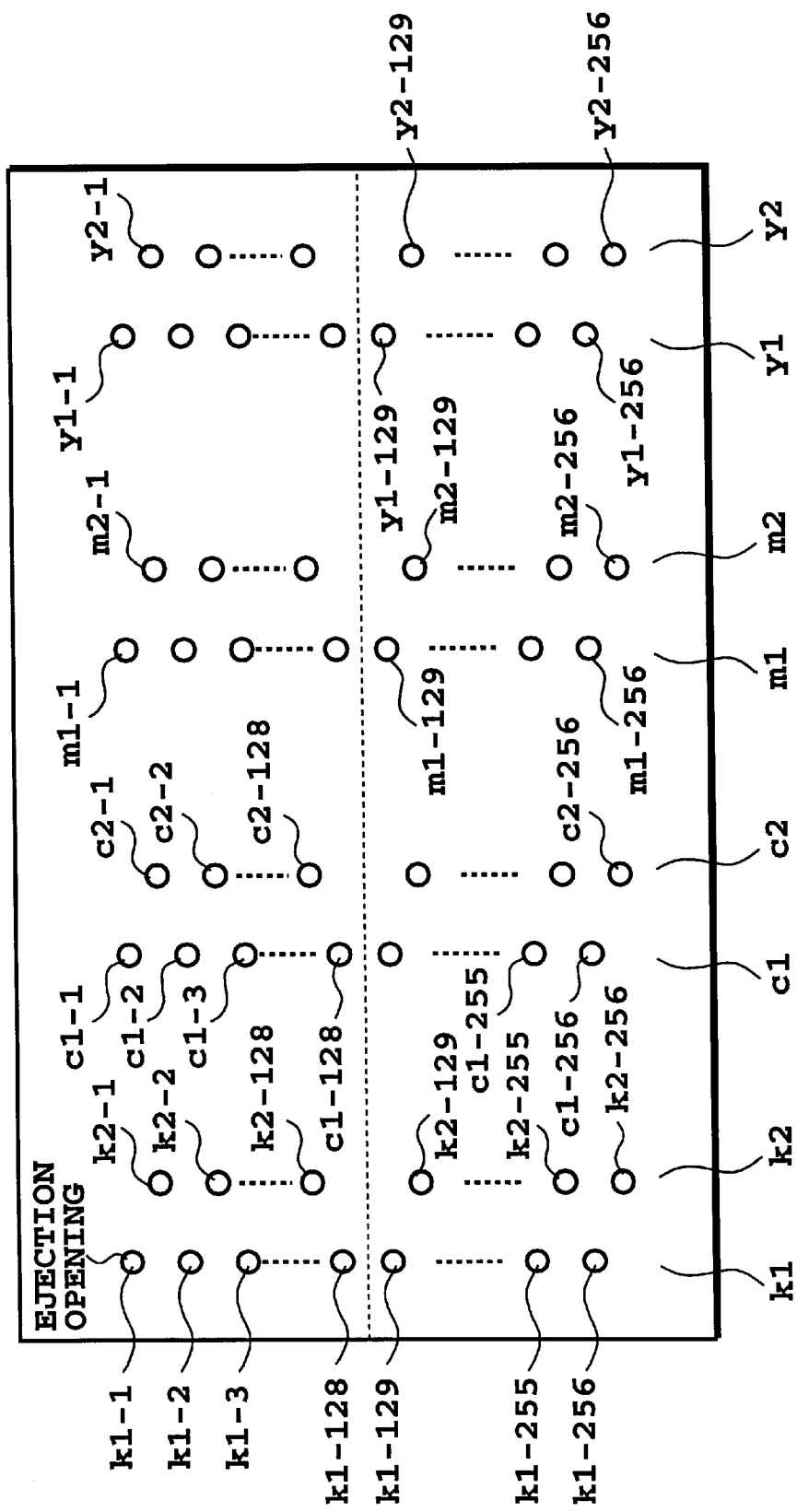
FIG. 7 is a schematic, external front view of the print head of the embodiment of this invention.

A first embodiment will be explained by referring to FIGS. 6 to 9. FIG. 6 shows an outline configuration of an example ink-jet printer that can apply the present invention. This printer has a print head 1 as shown in FIG. 7. The print head 1 has nozzle columns k1, k2 for ejecting a black ink, nozzle columns c1, c2 for a cyan ink, nozzle columns m1, m2 for a magenta ink, and nozzle columns y1, y2 for a yellow ink. It also has a flexible cable 2 to supply an electric signal from the printer body to the print head, a cap unit 3 to recover the ink ejection function, a paper feed tray 5 to supply a recording material (recording medium such as paper) 4. The printer with the above construction serially scans the print head 1 in a direction (main scan direction) B perpendicular to the feed direction A of the recording material 4 to perform printing in a width corresponding to the number of nozzles. At the same time, the printer intermittently feeds the recording material by a distance equal to the recording width during the non-printing periods.

The nozzle columns k1, k2, c1, c2, m1, m2, y1, y2 are each formed of 256 nozzles arranged at a density of 300 nozzles per inch, each of which delivers about 20 ng of ink. The nozzle columns k1, k2 are staggered from each other by ⅙₀₀ inch. They are spaced 30 nozzles or 0.1 inch apart in the main scan direction. Thus, the print density in the sub-scan direction is 600 dpi (dot per inch) and the printer is so constructed that the print density in the main scan direction will also be 600 dpi. The similar construction is employed also for c1-c2, m1-m2, and y1-y2 and the printer is constructed so that the print densities for these nozzles in the main scan direction will also be 600 dpi.

For black-and-white (monochromatic) printing, an input image is digitized by a quantization process that spreads errors in the lateral direction. The printing method employed is a multipass printing and one raster is formed by two nozzles of different nozzle columns. Because this embodiment is characterized by the order of driving the nozzles (print elements), the following explanation assumes that all pixels of the image data are printed (or painted solid black). FIG. 1 shows the number of passes required for the corresponding pixels to be formed.

Figure 8:
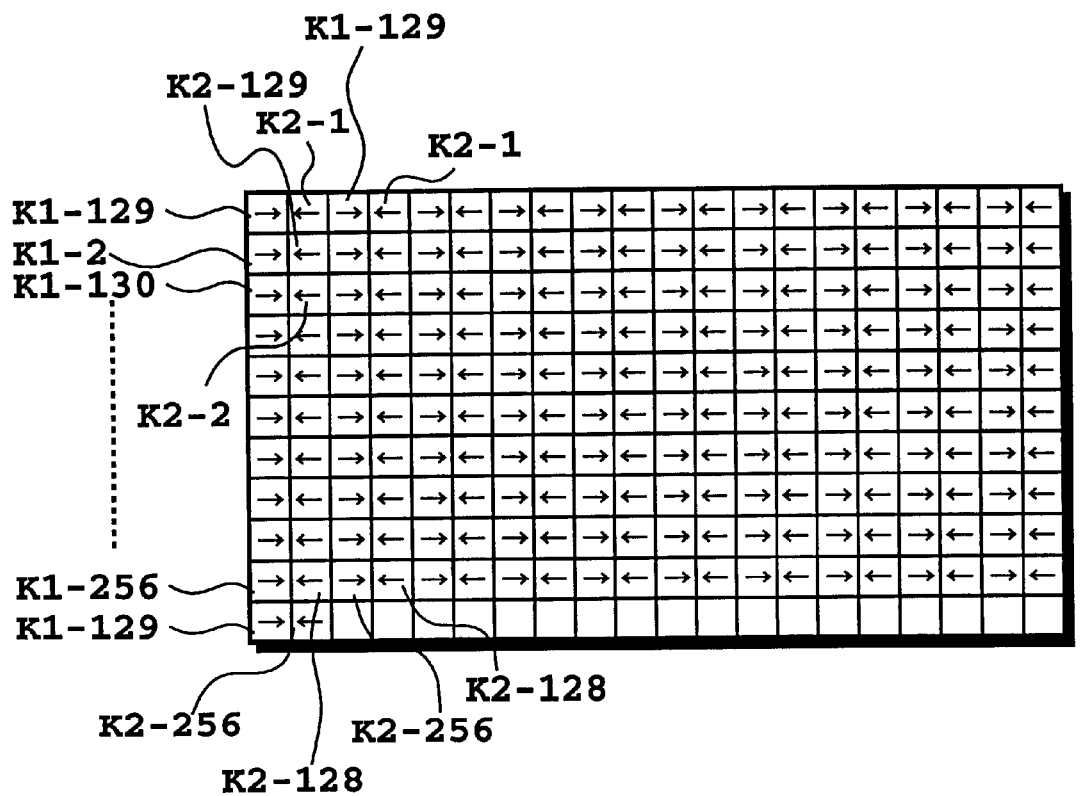
FIG. 8 is a schematic diagram showing the directions of landing deviations of dots on a recording medium produced by the embodiment of this invention.

After the recording material 4 is fed to a print start position, a first scan is performed. First, nozzles k1-129 to k1-256 of the first nozzle column in FIG. 7 are driven to print odd-numbered pixels of a first vertical column. The deviation direction of the dot landing positions and the nozzle numbers are shown in FIG. 8. As can be seen from FIG. 8, the dot landing positions for all of the pixels of the first column are deviated to the right in FIG. 8. Next, nozzles k2-129 to k2-256 of the second nozzle column are driven to print even-numbered pixels of a second column. Further, the print head 1 is moved in the main scan direction to the third column of pixels in FIG. 8, odd-numbered pixels of a third column are printed by the same nozzle column that was used for the first dot column. In this way, the print head 1 successively prints the odd-numbered columns of pixels as it moves in the main scan direction.

Figure 10:
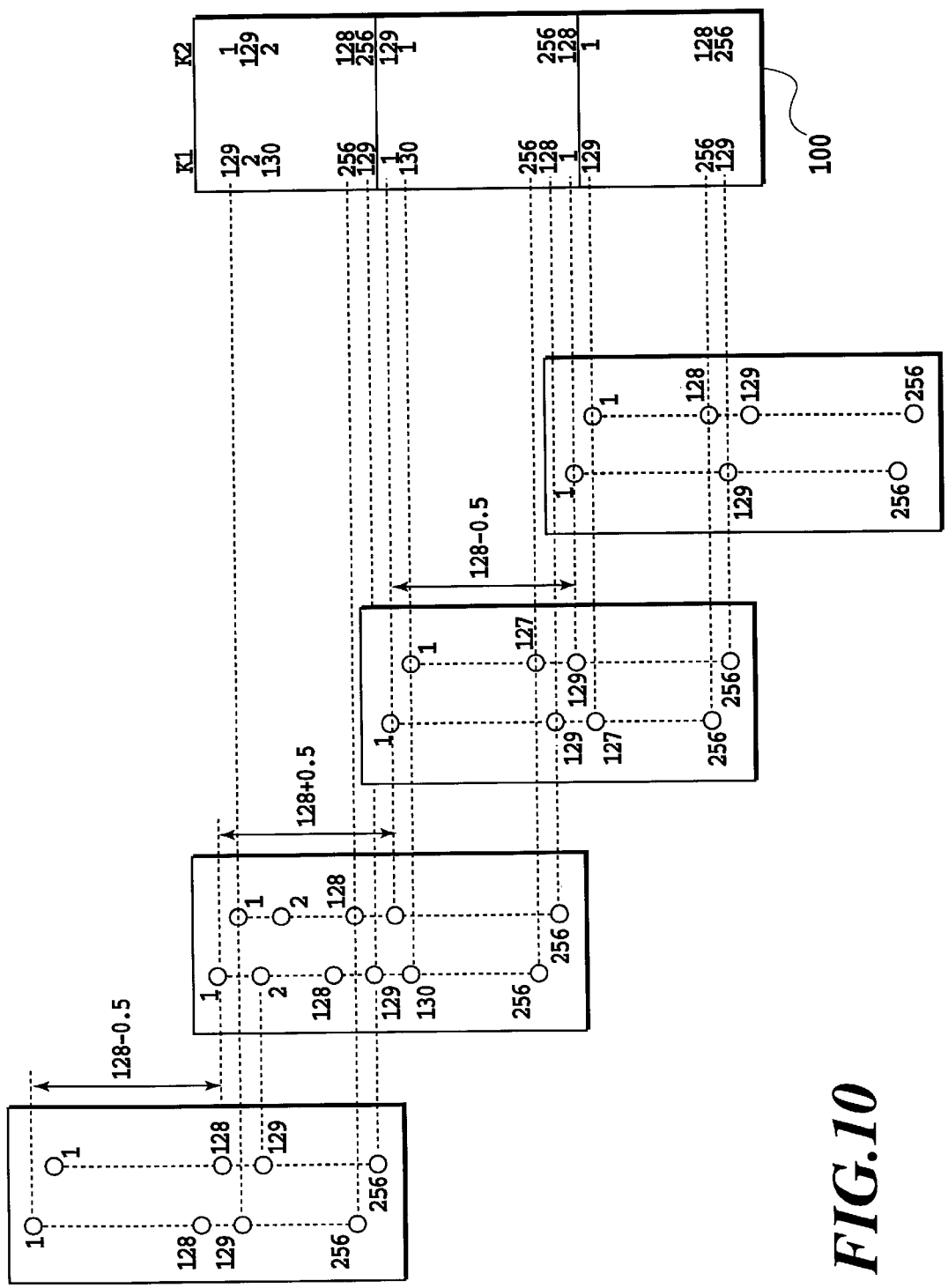
FIG. 10 is a schematic diagram showing the process of forming dots in the embodiment of this invention.

When the print head 1 arrives at the carriage return position, the print head 1 returns to the print start position in the main scan direction. During this period the recording material 4 is fed about half the length of the nozzle column, or more precisely 127 and one-half nozzles when viewed from one nozzle column in the example of FIG. 7. If the recording material 4 were fed by the distance equal to 128 nozzles, the nozzle k1-129 would assume the same position as the nozzle k1-1. But because the actual feed is ½ nozzle short, the nozzle k1-129 is located at the same position as the nozzle k2-1. Then, to print the same line on the recording material 4 that was previously printed, the nozzle columns of k1-2 to k1-129 and k2-1 to k2-128 are driven to perform the second multipass printing. In the conventional printer, the same line is printed by only the nozzle column k1 or k2, whereas this embodiment uses both of the nozzle columns k1 and k2 in printing the same line. For reference, FIG. 10 shows the print head position (shown to the left) and the correspondence between the positions of dots printed on the recording medium 100 by the print head and the nozzle numbers. The numbers assigned to the recording medium 100 correspond to the nozzle numbers of the print head. In the second printing, the nozzles k1-130 to k1-256 and k2-129 to k2-256 are printing the next band. Here only the uppermost line is shown.

The columns of nozzles k1-2 to k1-129 and k2-1 to k2-128, after printing at the first and second columns of pixel positions in FIG. 8, proceed to print at the third and fourth columns of pixels and then the fifth and sixth columns and so on, two columns of odd-numbered and even-numbered columns at a time.

Figure 2:
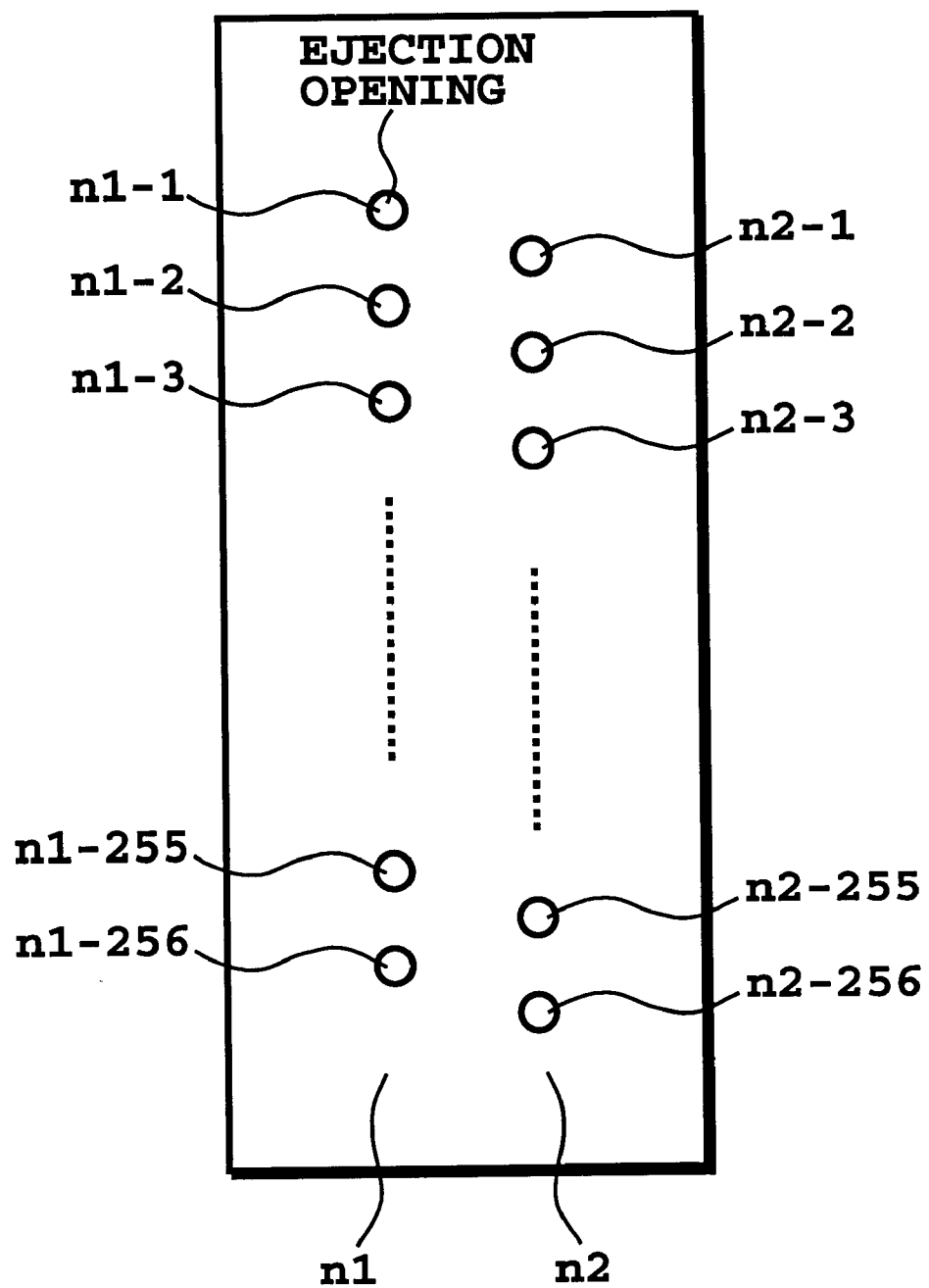
FIG. 2 is an external front view of a conventional print head.
Figure 3:
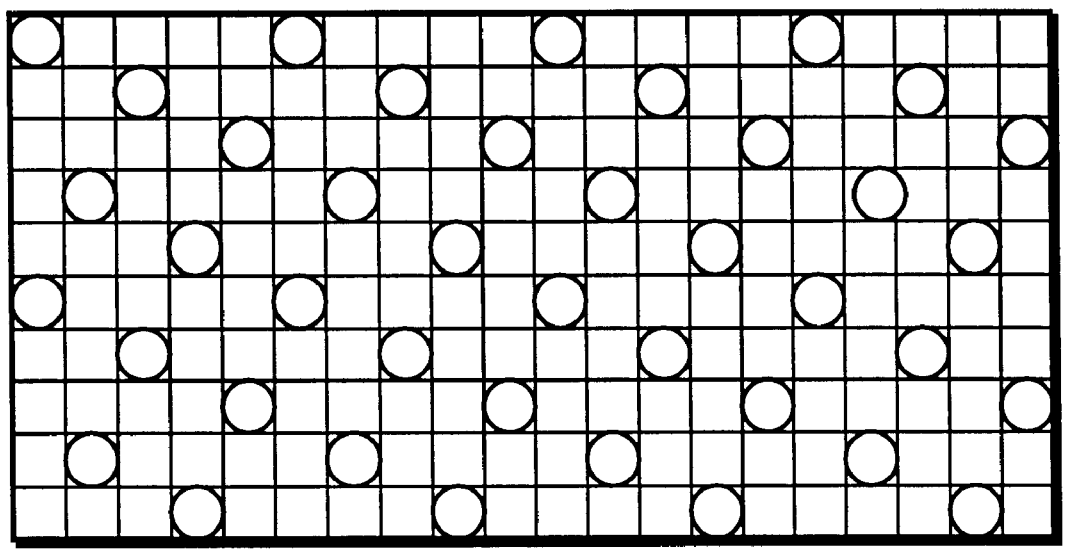
FIG. 3 is a schematic diagram showing ideal dot landing positions.
Figure 4:
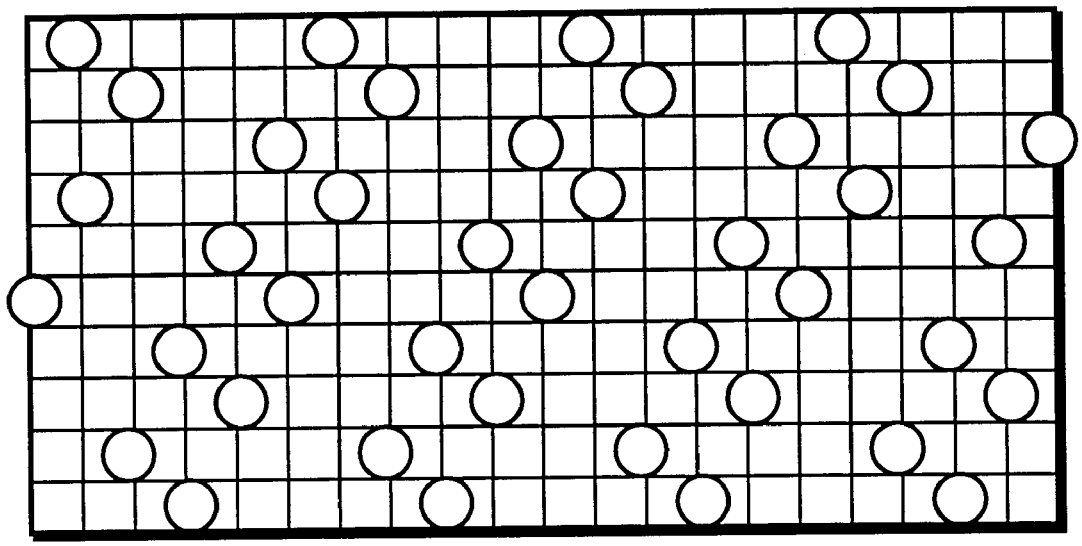
FIG. 4 is a schematic diagram showing a conventional output image.
Figure 9:
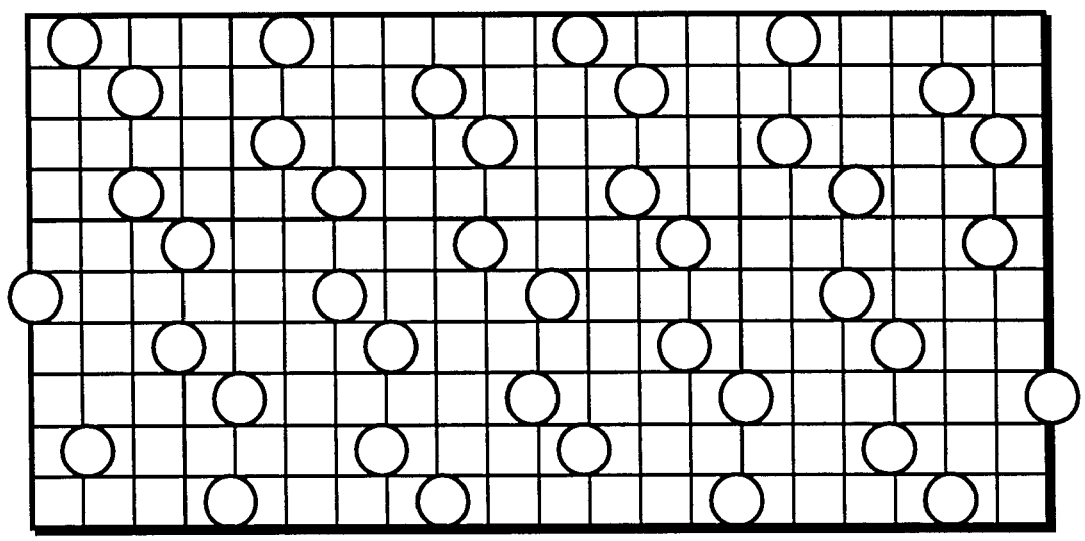
FIG. 9 is a schematic diagram showing the process of forming dots in the embodiment of this invention.

As described above, because the directions of dot landing deviations produced by the second nozzle column are opposed to those produced by the first nozzle column, performing the second pass of the multipass printing will make the dot landing deviation directions of the odd-numbered and even-numbered columns of pixel positions face each other as shown in FIG. 8. As a result, the adjacent odd-numbered and even-numbered columns of dots are closer together as shown in FIG. 9, thus preventing the printed image from appearing to have a slantwise texture as it would in the conventional printer as shown in FIG. 4. Because the multipass printing described above prints the same line by using different nozzle columns (first and second columns of nozzles), the distance by which the recording medium is advanced in the sub-scan direction is not always constant. The recording medium is sub-scanned by a distance equal to 128 plus or minus ½ nozzles. The nozzle column k2 is driven early compared with the nozzle column k1 to the extent that the nozzle column k2 is positioned further to the right in the main scan direction than k1.

In selecting the nozzles of the print head 1 according to the ink-jet printing method described above a known drive circuit may be used, and a person skilled in the art should be able to manufacture a drive control circuit to drive the nozzles in the above-described order. The drive control circuit may have a gate-array configuration or use a CPU. For example, the nozzles to be used in each scan can virtually be selected by masking the data for other than the pixels of the present scan number.

(Embodiment 2)

Figure 12:
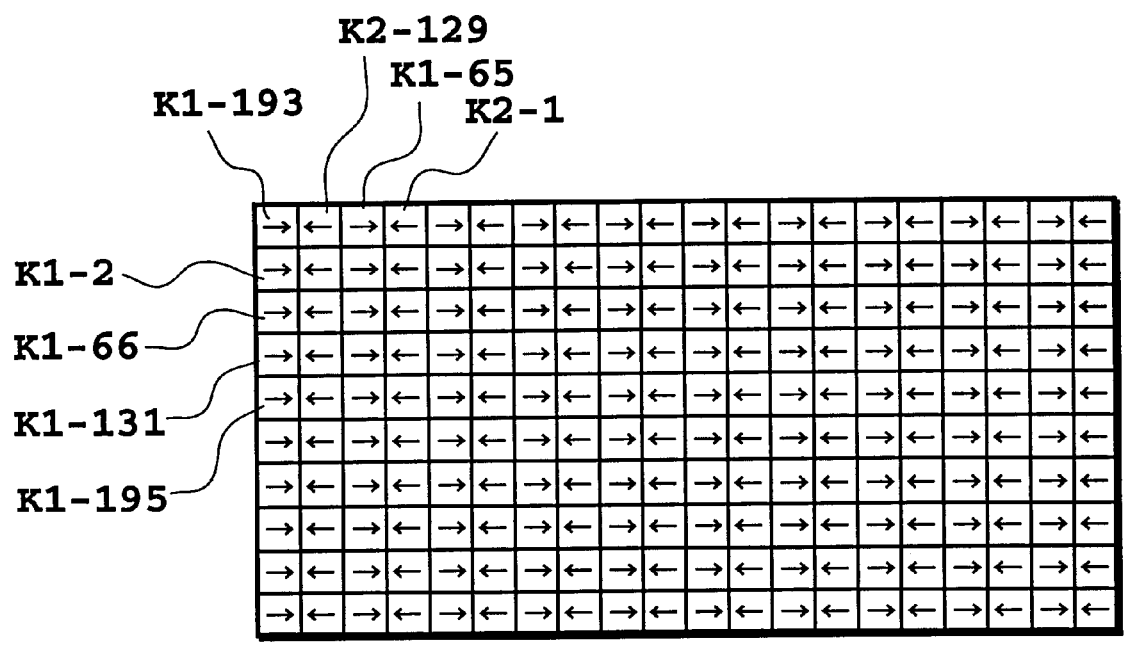
FIG. 12 is a schematic diagram showing the directions of landing deviations of dots on a recording medium produced by the second embodiment of this invention.

Next, the second embodiment of this invention will be described by referring to FIGS. 11 and 12.

FIG. 11 shows the correspondence between the block of the print head 1 and the print positions. In FIG. 11 the vertical axis represents a line position and the horizontal axis a pixel position. The numbers in a matrix of FIG. 11 indicate in which pass the corresponding pixels are formed.

While the embodiment 1 prints one line in two scans, the embodiment 2 prints one line in four scans. At the first column, fifth column, ninth column, . . . of pixel positions during the first scan, odd-numbered nozzles of an odd-numbered nozzle column (k1-193, 195, . . . , 255) are selected to print one line only.

During the first scan, at the second column, sixth column, tenth column, . . . of pixel positions, odd-numbered nozzles of an even-numbered nozzle column (k2-193, 195, . . . , 255) are selected (used). Similarly, at the third column, seventh column, . . . of pixel positions, even-numbered nozzles of an odd-numbered nozzle column (k1-194, 196, . . . , 256) are selected. At the fourth column, eighth column, . . . of pixel positions, even-numbered nozzles of an even-numbered column (k2-194, 196, . . . , 256) are selected. In this way, pixels are formed at positions indicated by "1" in FIG. 11 during the first scan.

Then, the recording material (print paper) is sub-scanned by a distance equal to 63 and ½ nozzles to start the second scan. At this time, if the paper were advanced 64 nozzles, the nozzle k1-193 would assume the same position as the nozzle k1-129. The actual advance, however, is ½ nozzle short, so that the nozzle k1-193 assumes the same position as the nozzle k2-129.

At the first column, fifth column, . . . of pixel positions, odd-numbered nozzles of an odd-numbered nozzle column (k1-131, 133, . . . , 255) are selected during the second scan. The second scan forms the pixels at positions indicated by "2" in FIG. 11. The third scan forms the pixels at positions indicated by "3" and the fourth scan by "4." The sub-scan feeds during the second and third scans are 64 plus ½ nozzles and those during the third and fourth scans are 63 plus ½ nozzles. That is, the sub-scans amounting to 64+½ nozzles and 64−½ nozzles are repeated.

While the above multipass printing is performed, the first or second nozzle column in other areas is performing the multipass printing on other lines.

Figure 13:
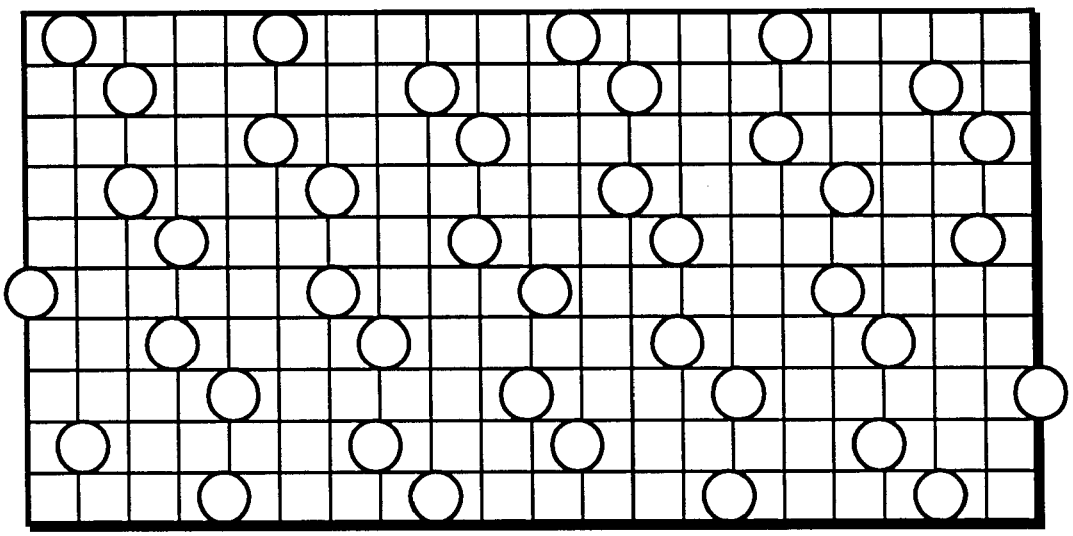
FIG. 13 is a schematic diagram showing an output image in the second embodiment of this invention.

In this embodiment, too, because the nozzle columns are selected so that the directions of landing deviations of dots formed by the first and second nozzle columns during the multipass printing on the same line are opposed to each other (see FIGS. 12 and 13), a slantwise texture found in the conventional printer does not appear. For reference, dot landing positions of an output image in the second embodiment are shown in FIG. 13. When the multipass printing is being performed at an intermediate position of the print paper, for example on a line in one area of the print head, the multipass printing is also being carried out on lines in other areas of the print head.

(Embodiment 3)

Figure 14:
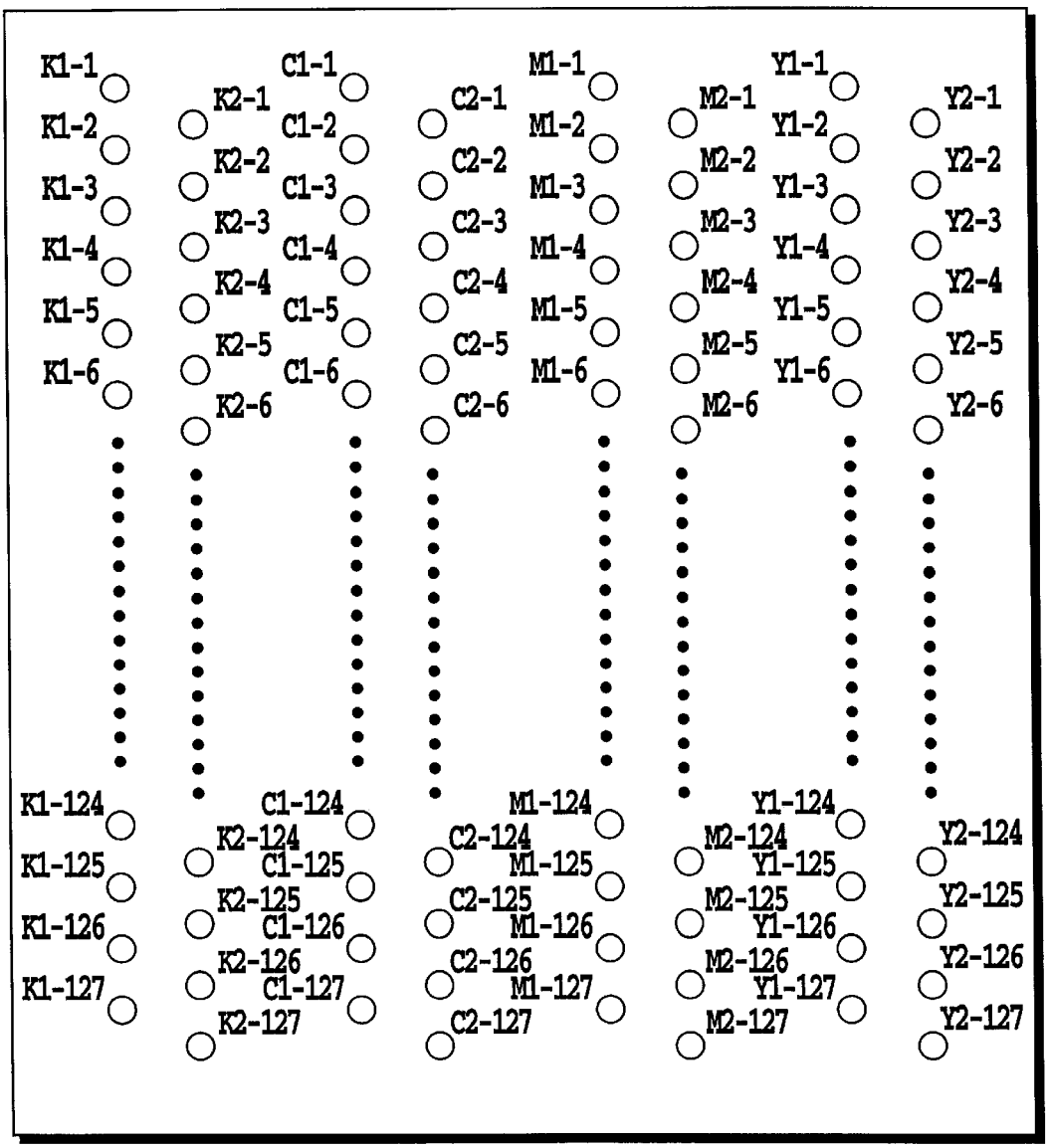
FIG. 14 is a schematic, external front view of the print head of a third embodiment of this invention.

Next, a third embodiment will be explained by referring to FIGS. 14 through 17. This embodiment uses a print head 8 as shown in FIG. 14, which differs in the number of nozzles from the print head 1 of the first embodiment. The nozzle columns k1, k2, c1, c2, m1, m2, y1, y2 each comprise 127 nozzles arranged at a density of 300 nozzles per inch.

The total number of nozzles for each color therefore is 254. For the print head with 128 nozzles in each column, 127 out of 128 nozzles can be used.

Figure 15:
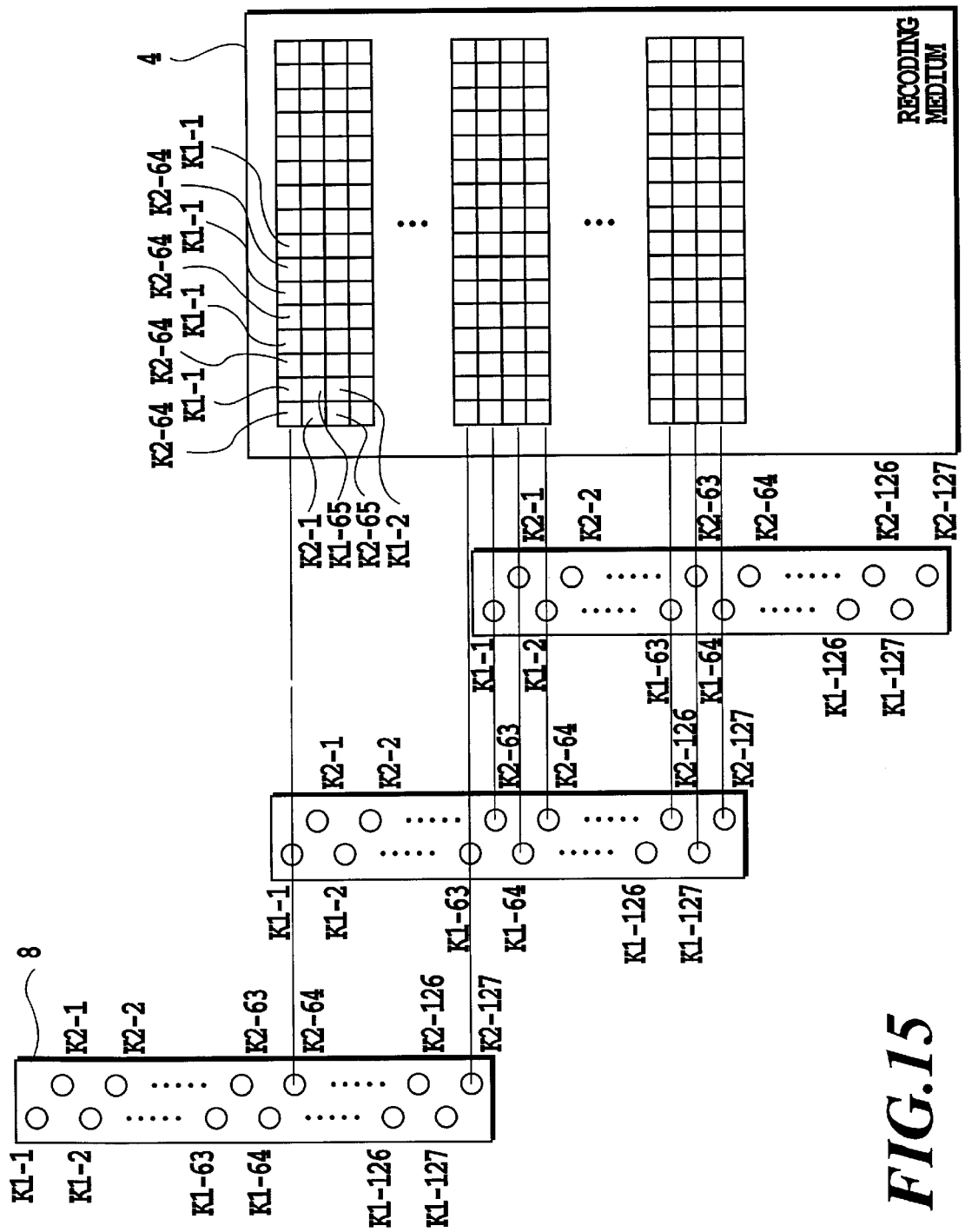
FIG. 15 is a schematic diagram showing dot landing positions on the recording medium in a third embodiment of this invention.
Figure 16:
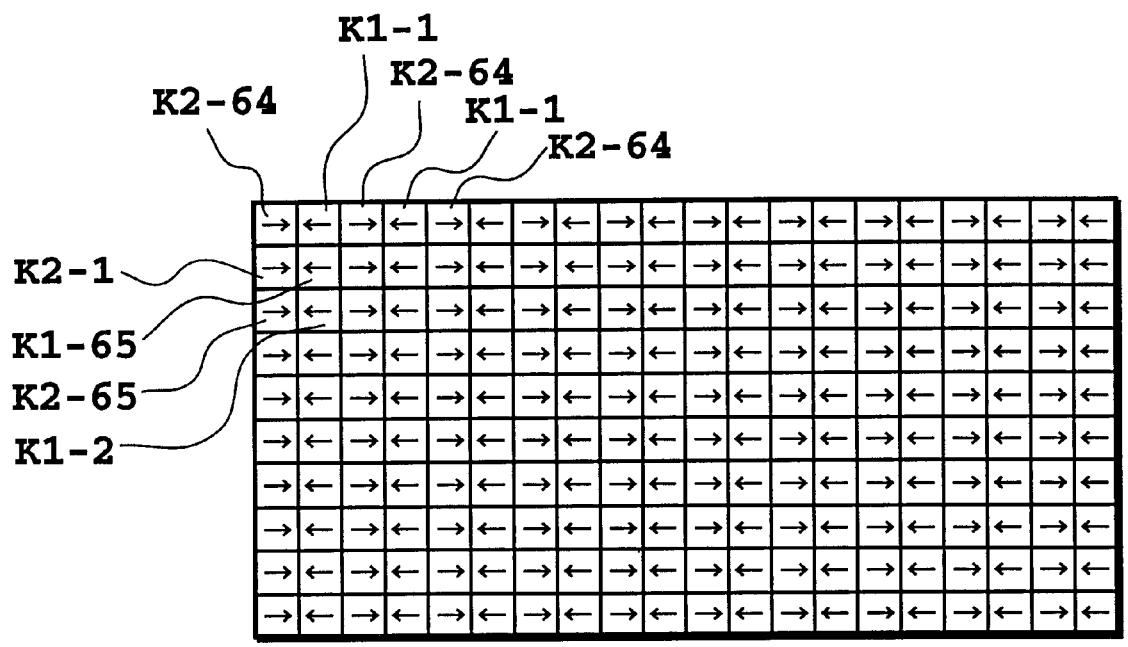
FIG. 16 is a schematic diagram showing the directions of landing deviations of dots on the recording medium produced by the third embodiment of this invention.

FIG. 15 shows the correspondence between the nozzle columns of the print head 8 and the pixel positions printed on the recording medium. Although in the actual printer it is the recording medium that is fed, FIG. 15 shows the print head to be shifted for simplicity. First, after the recording material 4 is fed to the print position, the first scan is performed. The nozzles of the first nozzle column k1-65 to k1-127 are driven to print odd-numbered pixels of the first vertical column. The directions of landing deviations of dots and the corresponding nozzle numbers during this printing are shown in FIG. 16. As can be seen from FIG. 16, all of the dots landing on the pixels of the first column are deviated to the right. Next, nozzles of the second column k2-64 to k2-127 are driven to print even-numbered pixels of the second column. When the print head 8 moves in the main scan direction to the third pixel column, the nozzle column that was used on the first column is driven to print odd-numbered pixels of the third column. In this way, the print head 8 successively prints at the odd-numbered pixel positions while moving in the main scan direction.

When the print head 8 reaches the carriage return position, it returns to the print start position in the main scan direction. In the mean time, the recording material 4 is advanced in the sub-scan direction by a distance equal to half the length of the nozzle column or, more precisely, 63.5 nozzles when seen from one nozzle column in the example of FIG. 16. The numbers assigned to the recording medium correspond to the nozzle numbers of the print head. In the second printing, nozzles k1-65 to k1-127, k2-64 to k2-127 are printing on the next band. Only the uppermost line is shown here.

As described above, because the directions of dot landing deviations produced by the second nozzle column are opposed to those produced by the first nozzle column, performing the second pass of the multipass printing will make the dot landing deviation directions of the odd-numbered and even-numbered columns of pixel positions face each other as shown in FIG. 16. As a result, the adjacent odd-numbered and even-numbered columns of dots are closer together as shown in FIG. 9, thus preventing the printed image from appearing to have a slantwise texture as it would in the conventional printer. In the above multipass printing, to print the same line by using different nozzle columns (first and second columns of nozzles) and make the paper feed in the sub-scan direction constant at all times, the nozzle columns each have an odd number of nozzles.

Figure 17:
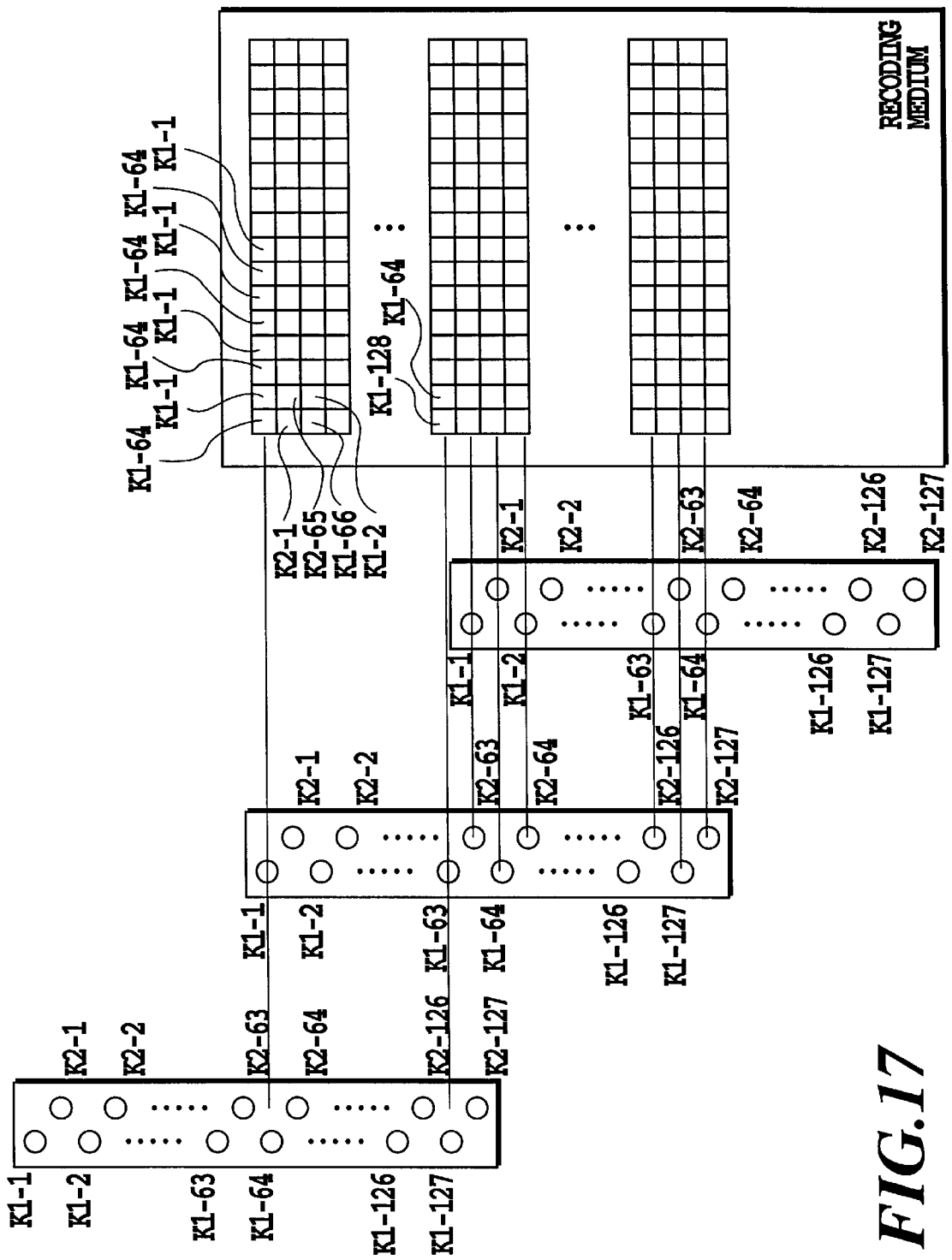
FIG. 17 is a schematic diagram showing the dot landing positions on the recording medium in the conventional example.

Because each nozzle column in this embodiment has an odd number of nozzles, both of the two nozzle columns are always used to print one raster. For reference, the conventional sequence of driving the nozzles, whose arrangement is identical to that of this embodiment, is shown in FIG. 17.

In the example of FIG. 15, the printing of one raster is performed by, for example, the nozzles k2-64 and k1-1. In other words, the nozzles k1-1 to k1-64 print at even-numbered pixel positions along the sub-scan direction on the recording medium and, by using the same even-numbered pixel position pattern, print at even-numbered pixel column positions along the main scan direction on the recording medium. Next, the recording medium is fed by a distance equal to 63.5 nozzles, and the nozzles k2-64 to k2-127 print at odd-numbered pixel positions along the sub-scan direction on the recording medium and, by using the same odd-numbered pixel position pattern, print at odd-numbered pixel column positions along the main scan direction on the recording medium. Driving two nozzle columns for printing in this manner produces two columns of dots whose landing deviation directions are opposed to each other.

In selecting the nozzle columns of the print head 8 according to the above-described ink-jet printing method a known drive circuit may be used, and a person skilled in the art should be able to manufacture a drive control circuit to drive the nozzles in the above-described order. The drive circuit may have a gate-array configuration or use a CPU. For example, the nozzles to be used in each scan can virtually be selected by masking the data for other than the pixels of the present scan number. Further, even when the nozzle columns each have an even number of nozzles, the use of the mask mentioned above allows these columns to be handled as if they have an odd number of nozzles, by masking one end nozzle at all times regardless of the contents of print data.

(Embodiment 4)

This embodiment allows a variety of print modes to be selected according to the recording medium used, print quality and printing time. FIG. 18 shows the number of print pulses, the number of nozzles used, and a feed distance in each print mode.

In addition to the embodiments described above, the following modifications may be made.

1) While the embodiment 1 uses two passes in the multipass printing and the embodiment 2 four passes, any number of passes can be used for the same line as long as the printing is performed in two or more passes. While the embodiment 1 and 2 use two nozzle columns for each color of ink, any number of columns may be used as long as they are two or more columns.

Figure 5:
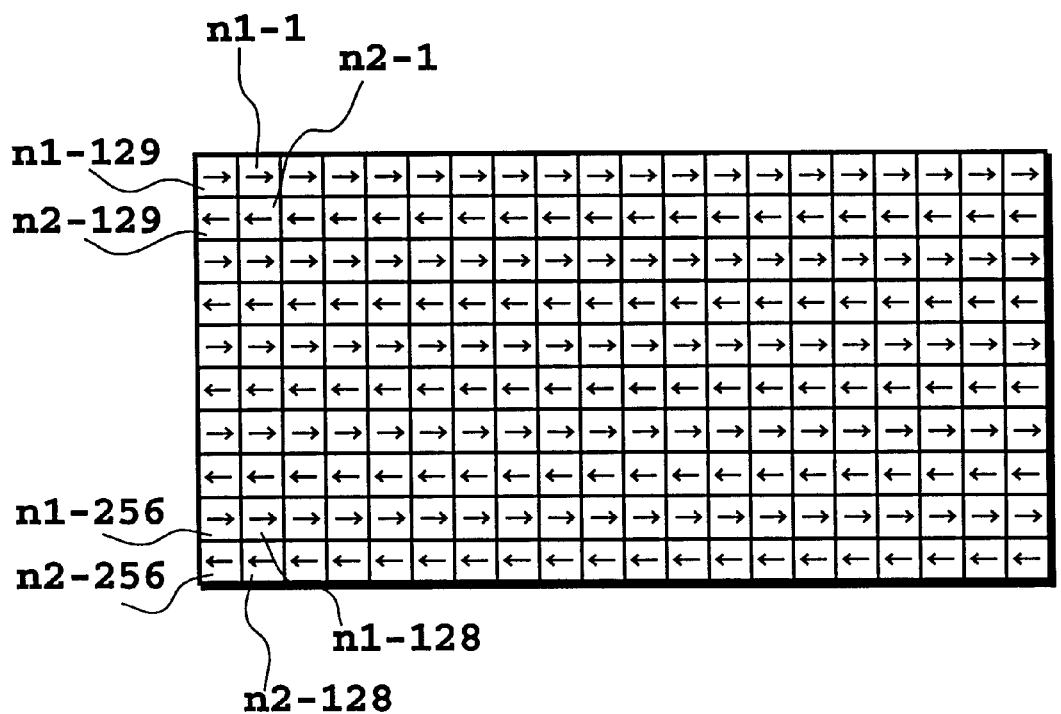
FIG. 5 is a schematic diagram showing the directions of landing deviations of dots on a recording medium produced by the conventional apparatus.

2) Both of the first and second nozzle columns of the print head 1 may have deviation characteristics in the same or opposite directions with respect to the directions shown in FIG. 5 due to variations of manufacture and assembly. Even in such a case, the directivity of the dot landing position deviations can be dispersed by using different nozzle columns in forming the same line.

3) While the above examples have been described by taking an ink-jet printer as an example, the invention can also be applied to a variety of printing apparatuses including those which print a plurality of dots with a plurality of print elements such as thermal imprint type print elements.

Figure 19:
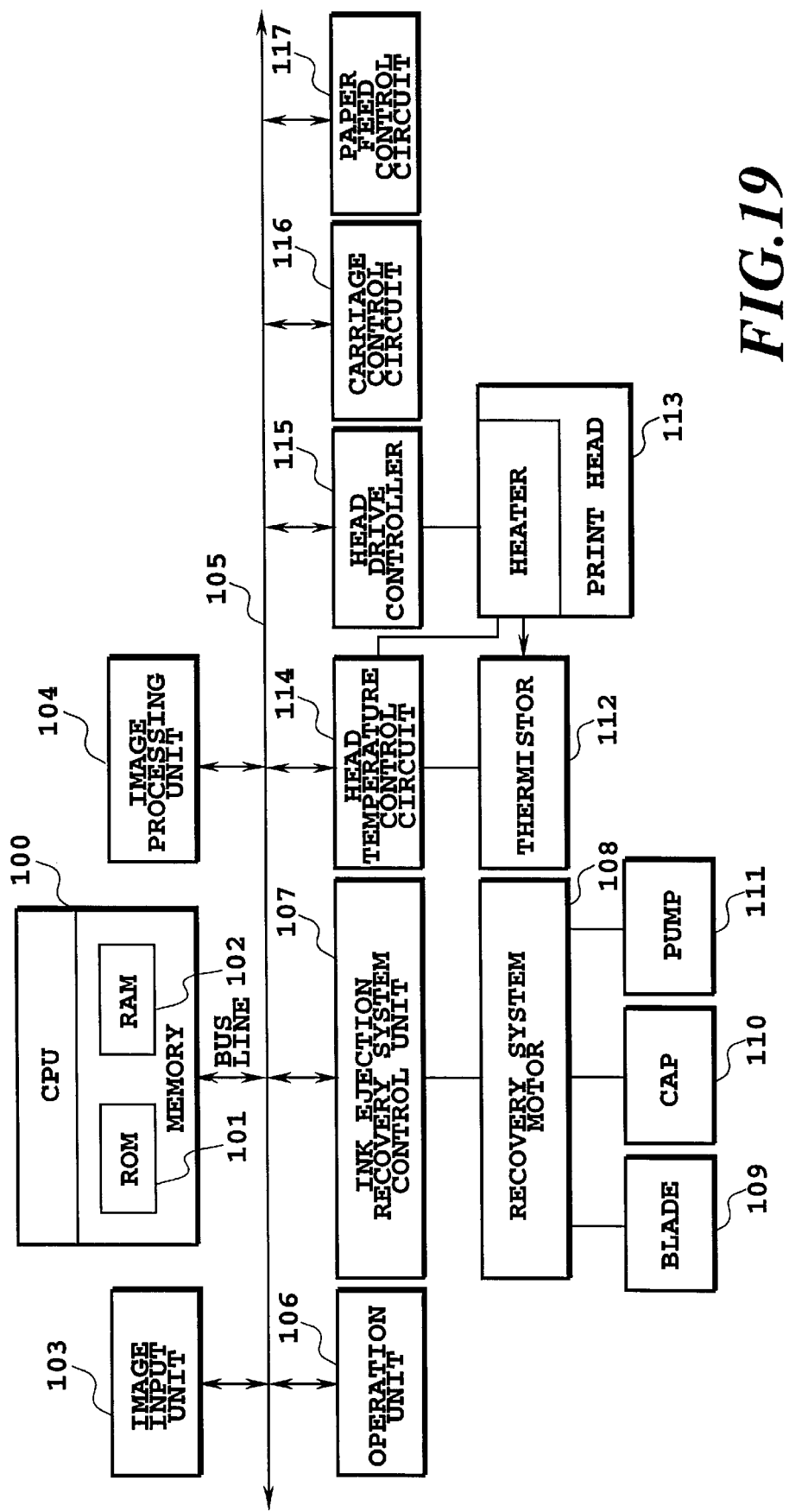
FIG. 19 is a block diagram showing the configuration of a control circuit used in the above embodiments of this invention.

Lastly, the configuration of the control circuit used in the above embodiments will be explained by referring to FIG. 19. FIG. 19 shows the configuration of the control circuit for the ink-jet printer of the above embodiments of this invention. In FIG. 19, a CPU 100 performs control on devices and data processing via a main bus line 105. According to a program stored in a ROM 801, the CPU 100 controls the conventionally known data processing and the head and carriage driving associated with this invention through the following devices. A RAM 102 is used as a work area for the data processing by the CPU 100. Hard disks may also be used as a storage. An image input unit 103 has an interface with a host equipment (such as a computer as an information processing device and an image reading device) and temporarily holds an image input from the host equipment. An image processing unit 104 performs color conversion processing and digitization processing. An operation unit 106 has keys, by which an operator can enter control inputs.

An ink ejection recovery system control circuit 107 controls the ink ejection recovery operations, such as preliminary ink ejection, according to the ink ejection recovery program stored in the RAM 102. That is, an ink ejection recovery system motor 108 drives a print head 113, a cleaning blade 109 and a cap 110 both disposed opposite the print head 113, and a suction pump 111.

A head drive control circuit 115 controls the driving of an ink ejection electricity-heat converter of the print head 113 to cause the print head 113 to eject ink droplets for preliminary ejection and for printing. A heater is provided to a substrate where the ink ejection electricity-heat converter of the print head 113 is installed, to adjust the temperature of the ink in the print head to a desired setting. A thermistor 112 is controlled by a head temperature control circuit 114 and also provided on the substrate and measures the virtual ink temperature in the print head. The thermistor 112 may also be installed outside the substrate, such as around the print head. Further, a carriage drive control circuit 116 and a paper feed control circuit 117 similarly control carriage movement and paper feed according to the program.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true sprit of the invention.

What is claimed is:

1. A printing apparatus using a print head to perform printing, comprising:

main scan means for scanning the print head relative to a recording medium in a main scan direction;

sub-scan means for scanning the recording medium relative to the print head in a sub-scan direction different from the main scan direction; and control means for controlling main-scanning of the print head a plurality of times over the same print line on the recording medium with at least one sub-scan operation interposed between the main scan operations to print the line, the print head having a plurality of staggered columns of print elements;

wherein the control means controls the amount of sub-scanning by said sub-scan means to position print elements of different columns on the same print line and also controls the use of print elements of different columns to complete the printing of the same print line by masking data for print elements in each main scan.

2. A printing apparatus as claimed in claim 1, wherein the print elements comprise print elements for an ink-jet printing system.

3. A printing apparatus as claimed in claim 1, wherein odd-numbered columns of the print elements and even-numbered columns of the print elements are staggered with respect to each other.

4. A printing apparatus as claimed in claim 3, wherein the control means controls the main scan of the print head to scan over the same print line in the main scan direction two times by interposing between the main scan operations the sub-scan operation which advances the recording medium by a distance equal to one-half the length of the print element columns plus or minus one-half the print element interval.

5. A printing apparatus as claimed in claim 3, wherein the control means controls the main scan of the print head to scan over the same print line in the main scan direction two times by interposing between the main scan operations the sub-scan operation which advances the recording medium by a distance equal to one-half the length of the print element columns plus or minus one-half the print element interval.

6. A printing apparatus as claimed in claim 3, wherein the odd-numbered columns and the even-numbered columns of the print elements each use an odd number of print elements for printing, and the control means controls the main scan of the print head to scan over the same print line in the main scan direction two times by interposing between the main scan operations the sub-scan operation which advances the recording medium by a distance equal to one-half the length of the print element columns.

7. A printing apparatus as claimed in claim 6, wherein said control means also controls the masking of data to the print elements not used for printing.

8. A printing apparatus as claimed in claim 3, wherein the odd-numbered columns and the even-numbered columns of the print elements each use four times an arbitrary odd number of print elements, and the control means controls the main scan of the print head to scan over the same print line in the main scan direction four times by interposing between the main scan operations the sub-scan operation which advances the recording medium by a distance equal to one fourth the length of the print element columns.

9. A printing apparatus as claimed in claim 8, wherein said control means also controls the masking of data to the print elements not used for printing.

10. A printing apparatus as claimed in claim 3, wherein the odd-numbered columns and the even-numbered columns of the print elements each use n times an arbitrary odd number of print elements, and the control means controls the main scan of the print head to scan over the same print line in the main scan direction n times by interposing between the main scan operations the sub-scan operation which advances the recording medium by a distance equal to one n-th the length of the print element columns where n is an arbitrary natural number other than 1.

11. A printing apparatus as claimed in claim 10, wherein said control means also controls the masking data to the print elements not used for printing.

12. A printing apparatus as claimed in claim 1, wherein said printing apparatus is capable of color printing and wherein said printing apparatus includes a plurality of columns of print elements for each print color.

13. A printing method using a print head to perform printing, the print head having a plurality of staggered columns of print elements, comprising the steps of:

moving the print head relative to a recording medium in a main scan direction;

moving the recording medium relative to the print head in a sub-scan direction different from the main scan direction; and controlling the main-scan of the print head to scan in the main direction a plurality of times over the same print line on the recording medium with at least one sub-scan operation interposed between the main scan operations to print the line, wherein the print elements of different columns are used to complete the printing of the same print line by masking data for the print elements in each main scan.

14. A printing method as claimed in claim 13, wherein the print elements comprise print elements for an ink-jet printing apparatus.

15. A printing method as claimed in claim 13, wherein odd-numbered columns of the print elements and even-numbered columns of the print elements are staggered with respect to each other.

16. A printing method as claimed in claim 15, wherein the control step controls the main scan of the print head to scan over the same print line in the main scan direction two times by interposing between the main scan operations the sub-scan operation which advances the recording medium by a distance equal to one-half the length of the print element columns plus or minus one-half the print element interval.

17. A printing method as claimed in claim 15, wherein the control step controls the main scan of the print head to scan over the same print line in the main scan direction two times by interposing between the main scan operations the sub-scan operation which advances the recording medium by a distance equal to one fourth the length of the print element columns plus or minus one-half the print element interval.

18. A printing method as claimed in claim 15, wherein the odd-numbered columns and the even-numbered columns of the print elements each use an odd number of print elements for printing, and the control step controls the main scan of the print head to scan over the same print line in the main scan direction two times by interposing between the main scan operations the sub-scan operation which advances the recording medium by a distance equal to one-half the length of the print element columns.

19. A printing method as claimed in claim 18, wherein the control step also controls the masking data to the print elements not used for printing.

20. A printing method as claimed in claim 15, wherein the odd-numbered columns and the even-numbered columns of the print elements each use four times an arbitrary odd number of print elements, and the control step controls the main scan of the print head to scan over the same print line in the main scan direction four times by interposing between the main scan operations the sub-scan operations, which advances the recording medium by a distance equal to one fourth the length of the print element columns.

21. A printing method as claimed in claim 20, wherein the control step also controls the masking data to the print elements not used for printing.

22. A printing method as claimed in claim 15, wherein the odd-numbered columns and the even-numbered columns of the print elements each use n times an arbitrary odd number of print elements, and the control means controls the main scan of the print head to scan over the same print line n times by interposing between the main scan operations the sub-scan operation which advances the recording medium by a distance equal to one n-th the length of the print element columns where n is an arbitrary natural number other than 1.

23. A printing method as claimed in claim 22, wherein the control step also controls the masking data to the print elements not used for printing.

24. A printing method as claimed in claim 13, wherein the printing method is capable of color printing and wherein the print head includes a plurality of columns of print elements for each print color.

* * * * *